(12) United States Patent
Schramm et al.

(10) Patent No.: US 11,345,091 B2
(45) Date of Patent: May 31, 2022

(54) NESTED SEGMENTS IN OBJECT MODELS FOR ADDITIVE MANUFACTURING

(71) Applicant: HEWLETT-PACKARD DEVELOPMENT COMPANY, L.P., Houston, TX (US)

(72) Inventors: Morgan T Schramm, Vancouver, WA (US); Matthew A Shepherd, Vancouver, WA (US); Jake Wright, San Diego, CA (US); Vanessa Verzwyvelt, Vancouver, WA (US); Xin Cheng, Vancouver, WA (US); Hector Lebron, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 57 days.

(21) Appl. No.: 16/081,606

(22) PCT Filed: Jul. 10, 2017

(86) PCT No.: PCT/US2017/041345
§ 371 (c)(1),
(2) Date: Aug. 31, 2018

(87) PCT Pub. No.: WO2019/013747
PCT Pub. Date: Jan. 17, 2019

(65) Prior Publication Data
US 2021/0221068 A1    Jul. 22, 2021

(51) Int. Cl.
*B29C 64/393*    (2017.01)
*B33Y 50/02*     (2015.01)
(Continued)

(52) U.S. Cl.
CPC ............ *B29C 64/393* (2017.08); *B22F 10/85* (2021.01); *B28B 17/0081* (2013.01);
(Continued)

(58) Field of Classification Search
CPC ....... B29C 64/393; B33Y 50/02; B22F 10/85; B28B 17/0081; G05B 19/4099; G05B 2219/35134; G05B 2219/49023
See application file for complete search history.

(56) References Cited

U.S. PATENT DOCUMENTS

| 9,119,696 B2 | 9/2015 | Giordano |
| 2014/0324204 A1 | 10/2014 | Vidimce et al. |

(Continued)

FOREIGN PATENT DOCUMENTS

| CN | 105538712 A | 5/2016 |
| JP | 2006503735 | 2/2006 |

(Continued)

OTHER PUBLICATIONS

Fabian, "How to Choose the Perfect Wall Thickness for 3D Printing", 3D Printing Blog, Retrieved from Internet: https://i.materialise.com/blog/how-to-get-the-perfect-wall-thickness-when-turning-your-3d-model-into-a-3d-print/, Apr. 6, 2017, 10 pages.

*Primary Examiner* — Thomas C Lee
*Assistant Examiner* — Ameir Myers
(74) *Attorney, Agent, or Firm* — HP Inc. Patent Department

(57) ABSTRACT

In an example, a method includes receiving, at a processor, a data model of an object to be generated in additive manufacturing. A virtual build volume comprising a representation of at least a portion of the object may be segmented into a plurality of nested segments comprising a core segment and a peripheral segment. Segmenting the virtual build volume may comprise determining a dimension of the peripheral segment based on at least one of a geometry of the object and an intended object property.

13 Claims, 5 Drawing Sheets

(51) Int. Cl.
    *B22F 10/85*     (2021.01)
    *B28B 17/00*     (2006.01)
    *G05B 19/4099*     (2006.01)

(52) U.S. Cl.
    CPC .......... *B33Y 50/02* (2014.12); *G05B 19/4099* (2013.01); *G05B 2219/35134* (2013.01); *G05B 2219/49023* (2013.01)

(56) References Cited

U.S. PATENT DOCUMENTS

| | | | |
|---|---|---|---|
| 2014/0336808 A1* | 11/2014 | Taylor | B29C 64/393 |
| | | | 700/98 |
| 2015/0259548 A1 | 9/2015 | Wang et al. | |
| 2016/0082666 A1* | 3/2016 | de Pena | G05B 19/4099 |
| | | | 700/98 |
| 2017/0002978 A1 | 1/2017 | Ballinger et al. | |
| 2017/0100210 A1 | 4/2017 | Wen | |
| 2017/0106588 A1* | 4/2017 | Tabayashi | B33Y 70/00 |
| 2018/0056591 A1* | 3/2018 | Harayama | B33Y 40/00 |
| 2018/0071986 A1* | 3/2018 | Buller | G05B 19/4099 |
| 2018/0117833 A1* | 5/2018 | Nagahari | H04N 1/40 |
| 2018/0215094 A1* | 8/2018 | Birnbaum | B29C 64/141 |
| 2018/0239251 A1* | 8/2018 | Lee | B33Y 10/00 |
| 2019/0039320 A1* | 2/2019 | Chou | B33Y 10/00 |
| 2019/0231018 A1* | 8/2019 | Boutin | A42C 2/00 |
| 2019/0315067 A1* | 10/2019 | Babu | B29C 64/386 |
| 2020/0016822 A1* | 1/2020 | Levy | B33Y 10/00 |
| 2020/0019142 A1* | 1/2020 | Ulu | B33Y 50/00 |

FOREIGN PATENT DOCUMENTS

| | | |
|---|---|---|
| JP | 2015093433 | 5/2015 |
| JP | 2016093914 | 5/2016 |
| WO | 2013072874 A1 | 5/2013 |
| WO | 2013113372 A1 | 8/2013 |
| WO | 2016108154 A1 | 7/2016 |
| WO | WO-2016140670 | 9/2016 |
| WO | WO-2016186609 | 11/2016 |
| WO | WO-2016186613 | 11/2016 |
| WO | 2016196382 A1 | 12/2016 |

\* cited by examiner

NESTED SEGMENTS IN OBJECT MODELS FOR ADDITIVE MANUFACTURING

BACKGROUND

Three-dimensional (3D) printing is an additive manufacturing process in which three-dimensional objects may be formed, for example, by the selective solidification of successive layers of a build material. The object to be formed may be described in a data model. Selective solidification may be achieved, for example, by fusing, binding, or solidification through processes including sintering, extrusion, and irradiation. The quality, appearance, strength, and functionality of objects produced by such systems can vary depending on the type of additive manufacturing technology used.

BRIEF DESCRIPTION OF DRAWINGS

Non-limiting examples will now be described with reference to the accompanying drawings, in which.

DETAILED DESCRIPTION

Additive manufacturing techniques may generate a three-dimensional object through the solidification of a build material. In some examples, the build material may be a powder-like granular material, which may for example be a plastic, ceramic or metal powder. The properties of generated objects may depend on the type of build material and the type of solidification mechanism used. Build material may be deposited, for example on a print bed and processed layer by layer, for example within a fabrication chamber.

In some examples, selective solidification is achieved through directional application of energy, for example using a laser or electron beam which results in solidification of build material where the directional energy is applied. In other examples, at least one print agent may be selectively applied to the build material, and may be liquid when applied. For example, a fusing agent (also termed a 'coalescence agent' or 'coalescing agent') may be selectively distributed onto portions of a layer of build material in a pattern derived from data representing a slice of a three-dimensional object to be generated (which may for example be generated from structural design data). The fusing agent may have a composition which absorbs energy such that, when energy (for example, heat) is applied to the layer, the build material coalesces and solidifies to form a slice of the three-dimensional object in accordance with the pattern.

In other examples, coalescence may be achieved in some other manner.

Another example of a print agent is a a coalescence modifying agent (which may be referred to as a modifying or detailing agent), which acts to modify the effects of a fusing agent and/or energy applied, for example by inhibiting, reducing or increasing coalescence or to assist in producing a particular finish or appearance to an object. A property modification agent, for example comprising a dye, colorant, a conductive agent, an agent to provide transparency or elasticity or the like, may in some examples be used as a fusing agent or a modifying agent, and/or as a print agent to provide a particular property for the object.

Additive manufacturing systems may generate objects based on structural design data. This may involve a designer generating a three-dimensional model of an object to be generated, for example using a computer aided design (CAD) application. The model may define the solid portions of the object. To generate a three-dimensional object from the model using an additive manufacturing system, the model data can be processed to generate slices of parallel planes of the model. Each slice may define at least a portion of a respective layer of build material that is to be solidified or caused to coalesce by the additive manufacturing system.

Figure 1:
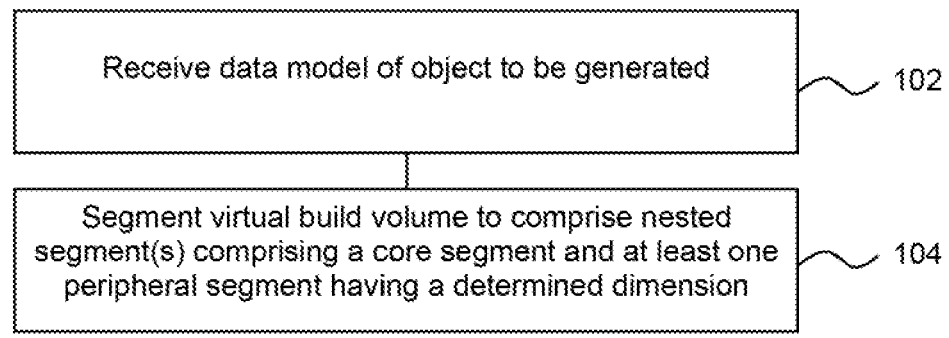
FIG. 1 is an example of a method for generating a segmented data model for an object to be generated in additive manufacturing.

FIG. 1 shows an example of a method which may be a computer implemented method, for example carried out using at least one processor, and may comprise a method of generating a segmented data model for an object to be generated in additive manufacturing. The segments may for example represent nested 'shells' of an object to be generated and/or a surrounding region which may be generated using different processing parameters. In some examples, the segments may for example represent object portions which are to be generated using particular combinations and/or amounts of print agents so as to have different properties, for example different colors, or different mechanical or functional properties. For example, a particular intended color may be provided by an outer shell having a first color, an inner shell having a different color, and a core of a third color.

Block 102 comprises receiving, at a processor, a data model of an object to be generated in additive manufacturing. The data model may for example be received from a memory, over a network, over a communications link or the like, and may model all or part of the object. In some examples, the data model may for example comprise object model data and object property data. The object model data may define a three-dimensional geometric model of at least a portion of the model object, including the shape and extent of all or part of an object in a three-dimensional co-ordinate system, e.g. the solid portions of the object. In some examples, the data model may represent the surfaces of the object for example as a mesh. The object model data may for example be generated by a computer aided design (CAD) application. Object property data may define at least one object property for the, or a portion of, three-dimensional object to be generated. If no object property data is present the object may have some default properties based on the build material and print agents used. In one example, the object property data may comprise any or any combination of a color, flexibility, elasticity, rigidity, surface roughness, porosity, inter-layer strength, density, transparency, conductivity and the like for at least a portion of the object to be generated. The object property data may define multiple object properties for a portion or portions of an object, and the properties specified may vary over the object.

Block 104 comprises segmenting, by the processor, a virtual build volume comprising at least a portion of the object (or a representation thereof) into a plurality of nested segments comprising a core segment and at least one peripheral segment. Determining the segments comprises determining a dimension of the peripheral segment(s) and may be based on at least one of a geometry of the object and an intended object property (e.g. color, strength, resilience, or the like).

The virtual build volume may for example comprise a boundary box enclosing the object, may be the size and shape of the object (i.e. follow the surfaces of the object), and/or represent at least part of a build volume in which the object is to be fabricated. In some examples, the virtual build volume may comprise one or more 'slices', each of which may represent a layer of the object to be fabricated in layer-by-layer additive manufacturing of the object, and/or at least part of a fabrication chamber in which the object is to be fabricated.

In some examples, as described in greater detail below, a plurality of nested peripheral segments may be generated. Such segments may be peripheral to an inner peripheral segment or to the core.

The nesting of the segments may be complete or partial (i.e. a peripheral segment may extend around the entire perimeter of the core segment or an inner peripheral segment, or around just a portion of the perimeter). In some examples, at least one peripheral segment may form a shell around a core segment. The core may comprise any inner segment which has a peripheral segment formed around at least a part thereof.

In some examples, the determined dimension of the peripheral segment comprises a thickness (which may be a thickness in two or three dimensions) of at least one peripheral segment around the object core segment. As is further set out below, in some examples, the thickness of such peripheral segment(s) may vary based on a local geometry and/or a locally intended object property.

The segments may be processed separately when determining instructions for generating the object. For example, different mapping resources or rules may be applied to the different segments.

Differentiating between segments may have a number of uses in additive manufacturing. For example, when printing 3D color objects, there may be trade-offs between the desired color of the objects and the mechanical properties of the objects. Higher density 3D objects that have significant mechanical strength and functionality can be produced when a greater amount of thermal energy is applied to the build material for fusing the layers together. The amount of thermal energy available for fusing depends in part on the intensity with which the fusing agent absorbs the radiation, and the radiation absorptivity of the fusing agent depends in part on the color of the fusing agent. For example, the absorption intensity of near-infrared colored fusing agent with cyan, magenta, or yellow (C, M, or Y) colorant is generally lower than that of, for example, carbon black-based fusing agent which is an effective absorber of energy. Therefore, the level of fusing of any build material to which color agents are applied may be lower for than it is for similarly produced 3D printed black objects, which may result in color objects having lower densities and less mechanical strength and functionality than comparable black objects.

However, by differentiating between segments when producing instructions for generating the object, a colorful shell corresponding to a peripheral segment may for example be formed around a strong core to which a carbon black based fusing agent is applied. This allows the object to be colorful without unduly compromising its strength.

While in some examples, a colored peripheral segment could be determined about a core segment which is fused using a carbon black based fusing agent, the color gamut of resulting object may be reduced by the surface visibility of the underlying core segment (which may be particular the case for partially transparent outer peripheral segments). Providing a thicker outer segment provides a higher degree of masking of the color of the core, but may sacrifice strength and/or increase costs (for example the cost of colored agents may be higher). Providing at least one intermediate peripheral segment may allow for a more gradual transition of properties (e.g. from black to colourful).

While the example of color has been used here, the same is true for other properties: for example, an object may be generated so as to comprise a core which is relatively strong but may be relatively brittle. This could be protected by an outer segment which is relatively resilient, with the thickness of the segment being determined according to the level of protection required. By providing a number of peripheral segments (e.g. n shells), a smooth and/or gradual transition from core to surface may be made. If instead there was, for example, a brittle outer segment around a strong core, this could give way in a manner so as to result in a sudden load spike on the core. With a smooth transition across n nested segments, weaker outer segments may gradually give way under stress.

Moreover, overlying peripheral segments of increasing resilience towards the surface may protect the core segment from shattering more effectively than a single resilient segment surrounding the core by absorbing energy while giving an intended surface resilience. The resilience of such peripheral segments, and their thickness, could therefore be determined on a segment-by-segment basis.

In some examples, a segment thickness may be sacrificed, for example, to allow another segment to occupy a greater volumetric proportion. For example, an outer peripheral segment may be reduced in width to allow an inner segment (which may be the core segment or an inner peripheral segment) to have a particular strength, fusing heat, to have a threshold size, or the like.

In examples in which determining the dimension (e.g. thickness) is based on object geometry, this may comprise determining a local feature size, for example the cross sectional area of the object at a location. In another example, determining the thickness based on object geometry may comprise determining a location of a segment (or portion of the segment) within an object: for example, higher portions of the object (those formed later in a fabrication process) may be associated with a different segment thickness than lower portions, and/or upwards facing faces may be associated with a different segment thickness than downwards facing faces, which may take into account thermal consideration during manufacture, or the like.

In examples in which determining the dimension is based on object properties (which may vary between and/or within objects), this may comprise determining the dimensions based on property thresholds, an intended property gradient (e.g. a conductivity gradient, a resilience vs. stiffness gradient or the like), and/or a quality specification.

To consider an example of property thresholds, an object may have two or more properties which it may difficult to achieve with a homogeneous application of print agent(s) to the whole object. For example, there may be a threshold strength and color specified. In practice, as set out above, colored objects may be relatively weak in some examples. Therefore, in some examples, the threshold strength may be provided by a core portion and the color by a peripheral segment. The thickness of the peripheral segment may be determined so as to provide a core which provides at least a threshold strength and/or so as to provide a threshold color quality such as brightness. In some examples, it may not be possible to provide a combination of qualities, either given available materials or given object geometry or the like (for example, it may be difficult or impossible to provide high strength with high resilience, or high strength and bright colors). In such an example, a first segment may be specified to provide one of the properties (for example according to a predetermined hierarchy), and the other property may be matched as closely as possible given that constraint.

In another example, a property such as color may be specified and a segment may be determined so as to provide the color in as thin a segment as possible, as colored print agents may be associated with higher costs. For example, this may vary based on the lightness of the color and/or the transparency of the material and the like To consider an example of a quality specification, a segment, which may be an outer segment, may associated with processing parameters which are intended to provide a bright color, which may be provided at the cost of object strength (for example, there may be a higher ratio of colorants to fusing agents than in other portions). In segmenting a model of an object which is associated with a high color quality specification, such a segment may be specified to be relatively thick. However, when a lower color quality is acceptable, the segment may be specified, but be relatively thin. The converse may be true for a strength specification, i.e. a high strength specification may be associated with a thin colourful segment (because, as noted above, colorful segments may tend to be weak in some examples). In another example, a segment may be determined so as to provide a threshold parameter in a particular first property (e.g. strength) and the remaining segments may be determined so as to, for example, optimise a second property (e.g. colorfulness) given the constraint to the first parameter.

To consider a property gradient, each segment may be associated with a stage in a varying property parameter. For example, an outer segment may have a high resilience, and intermediate segment may have an intermediate resilience and a core may have a relatively low resilience (in some examples being relatively brittle). In another example, an outer segment may be a bright color, an intermediate segment may have an intermediate color and a core may have a relatively dark color. In such examples, the relative thickness of the segments may determine the appearance and/or functional behaviour of an object, for example the threshold force to cause permanent damage thereof, or a brightness of an outer segment. The thickness of the segments may be chosen accordingly.

The segments may be determined for an object as a whole (or for a build volume encompassing the object as a whole) or may be determined for a, or for each, 'slice' of the build volume/object which may correspond to a layer of build material to be processed to generate a layer of the object in a layer-by-layer additive manufacturing process.

Figure 2A:
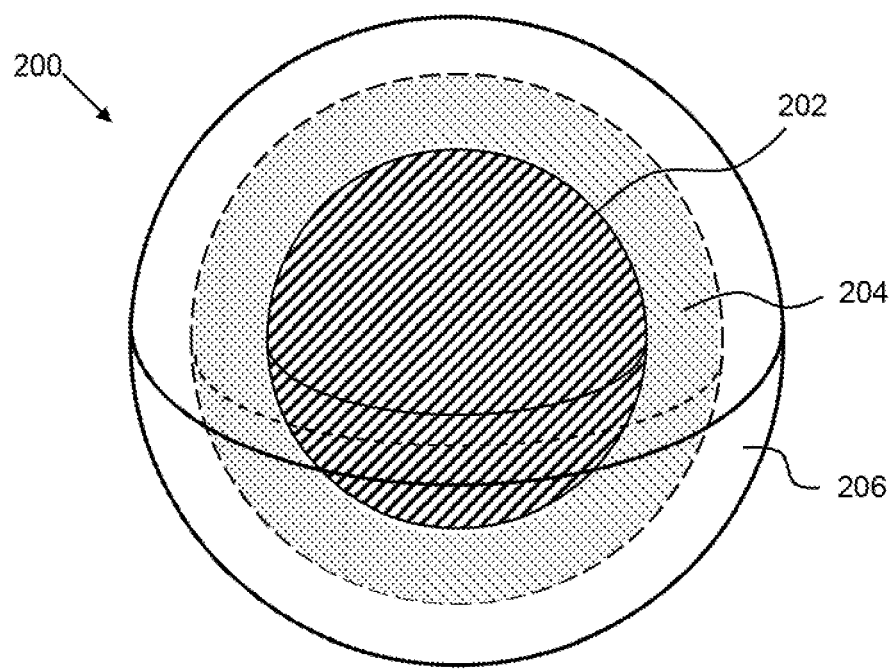
FIGS. 2A, 2B and 2C show examples of segmented models.

FIG. 2A shows an example of a representation of a 3-dimensional object 200, in this example a sphere, divided into segments. In this example, there is a core segment 202 surrounded by two concentric shell-like peripheral segments 204, 206. The thickness of the peripheral segments 204, 206 may be determined according to the method of block 104 above. For the purpose of discussion, the object 200 may be considered to be represented in a manner similar to a 'geological model', having a core (core portion 202), a mantel (inner shell 204) and a crust (outer shell 206).

In an example of the method of FIG. 1, the data model received in block 102 may be a model of a sphere, and the segments 202, 204, 206 may be determined in block 104.

Although in this example, the core segment 202 is substantially central within the object 200, this need not be the case in all examples. In addition, while the peripheral segments 204, 206 in this example are concentric, and the boundaries thereof follow the contours of the surface of the object 200, they lack either or both of these qualities in other examples. Indeed in some examples, there may be a plurality of object core segments 202 around which peripheral segments 204, 206 are formed.

Figure 2B:
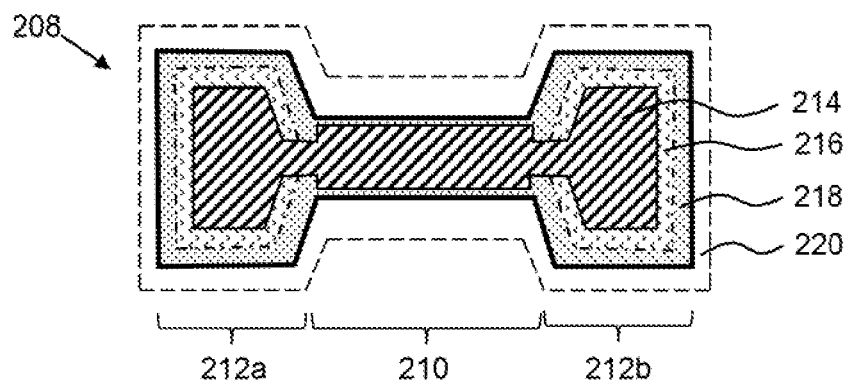

FIG. 2B shows a representation of a slice 208 of an object to be generated. In this example, the object comprises an elongate structure with a narrow central section 210 and two wider end sections 212a, 212b. In this example, the core segment 214 extends towards either end of the object via the central section 210. At either end, there are two peripheral segments 216, 218 formed, but while an outer peripheral segment 218 extends through the central section 210, the inner peripheral segment 216 does not (i.e. viewed one way, it may be considered to have a thickness of zero in the central section). Moreover, in this example, the thickness of the outer peripheral segment 218 decreases in the relatively narrow central section 210, allowing the width of the core segment 214 to be increased.

In some examples therefore, as is demonstrated in the example of FIG. 2B, determining a segment in block 104 may comprise segmenting the model received in block 102 (in this example, the model of the slice 208) at least one peripheral segment to have a variable thickness (i.e. Is thicker at some points than at others) and determining a peripheral segment having a thickness in a first object region which is non-zero and a thickness in a second object region which is zero.

In this example, there is a further peripheral segment 220 formed outside the object. To continue the example of a geological model above, this peripheral segment 220 may be thought of as comprising the 'atmosphere' of the object. In other words, in some examples, determining a peripheral segment in block 104 may comprise determining at least one segment which is external to the object. This segment may be used to define print instructions which may provide thermal control or to enhance object properties, as further described below.

Figure 2C:
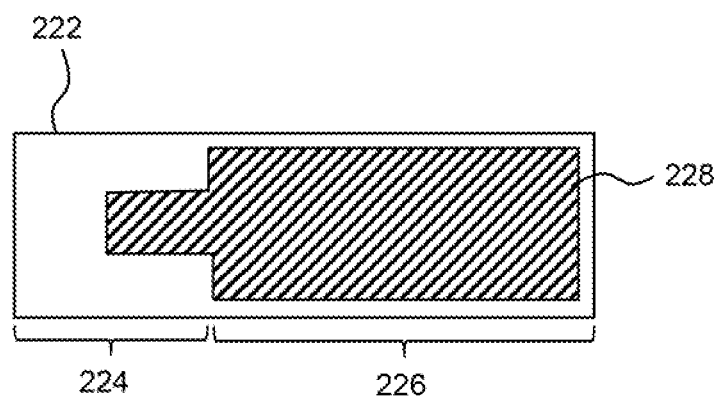

In FIG. 2C, a peripheral segment 222 is wider in a first region 224 than in a second region 226 (and a core segment 228 is correspondingly narrower in the first region 224 than in the second region 226. This may allow properties to be different in the different regions 224, 226. For example if the peripheral segment 222 is to be processed to provide a colourful shell and the core is to be processed to provide strength (for example, comprising a high proportion of 'carbon black' fusing agent), there may be different tradeoffs between the thickness of the first and second regions: the first region 224 may be more colorful than the second region 226 as it has a thicker peripheral segment 222, whereas the color of the second region may be dominated by the color of the core segment 228 (which may be formed of carbon black, and therefore be relatively dark in color, even if an overlying but relatively thin peripheral portion is formed). However, the second region 226 may be relatively strong as, as described above, colored portions may have a lower strength due to their generally lower capacity to absorb radiation.

Where slices of the object are formed into segments, this may be carried out independently for different segments. For example, a core segment in one slice may be aligned with, partially aligned with, or non-overlapping to a core segment in a previous or subsequent slice. Different slices may have differing numbers of segments.

In some examples, the thickness of the peripheral segment(s) may determine a rate of change of the characteristics, and by therefore selecting the thickness (or dimension) of each peripheral segment, greater control over the characteristics may be obtained. In some examples, the thickness of a peripheral segment or segments may allow control over a trade off between appearance properties and mechanical properties. A thickness of a peripheral segment may also be set so as to allow, for example, another peripheral segment (e.g. core or inner peripheral segment providing strength) of a threshold size or volumetric proportion to be provided.

In some examples, a lower-tint fusing agent may be used in place of carbon black in relation to at least some segments, which may increase a gamut of colors available to an object. However, where such an alternative fusing agent is a less efficient thermal absorber and/or more expensive (either in itself or in that more agent or energy may be applied to allow fusing temperatures to be reached), its use may be controlled, such that it is used in just those circumstances where it provides a particular benefit such as colorfulness. For example, Its use may be constrained to the peripheral segment(s) (for example, outer peripheral segment(s)) in which the colorfulness can be seen by an end user.

For example, lower slices of the object (to be formed as the initial layers thereof, i.e. to be manufactured first in a layer by layer manufacturing process) may be segmented such that with higher amounts of fusing agents (or of a fusing agent associated with more efficient energy absorptance, such as carbon black) may be applied thereto than may be applied to upper layers, which may be absorb heat from a previous layer. In another example, due to the nature of additive manufacturing, the color of a face of the object may be dependent on the spatial orientation of the face. As a result, the segmentation may be formed based at least in part on the orientation of at least a portion of a face of the object affected by the segment.

In some examples, therefore, defining segments allows for processing of each segment to provide different characteristics: for example, a core may be processed to provide high density and high mechanical strength, and may be surrounded by an outer shell structure with a lower density but high quality vivid color. An Intervening peripheral segment may obscure or reduce the effect of a dark core on such a vivid outer peripheral segment. Each segment within an object can be processed using different 3D print processing parameters chosen to achieve intended characteristics for that segment. The processing parameters may allow selection of predetermined agents and/or amounts or proportions of such agents. In other examples, a pattern of application of the agents may vary between the layers. For example, agent clustering may vary to provide or enhance certain properties.

In some examples, the processing parameters associated with a segment may specify accessible print agents, print agent combination(s), and/or print agent amounts, and may differ between segments. In some examples, the processing parameters may be held in the form of a mapping resource such as a look-up table or mapping algorithm used to identity print agent amounts and/or combinations to apply to an object region corresponding to a particular object segment, with different or modified mapping resources being associated with different segments.

As mentioned above, in some examples, nested peripheral segments may very in dimensions allows a greater versatility in additive manufacturing, for example providing a greater range of object properties and functionality. For example, the visual requirements for color may vary over an object portions of the object which are unlikely to be visible in normal use, or which are relatively small or geometrically complex (the human eye being relatively less sensitive to color variations over such areas) may be printed with a lower quality standard applied to color without sacrificing the perceived color quality of the object. Thus a peripheral segment may be thinner in such sections and a use of colored print agents may be less than if such a segment was thicker. In another example, the bottom section of an object may have different dimensional tolerances or strength properties than the top of a part. A volume of a core segment may be increased in such an object portion. As a fine feature may be weaker than parts with a larger cross-section, any core may for example constitute a relatively large proportion of the cross-sectional area of the object at such a point (which may for example sacrifice colorfulness, although as noted above, this may be less critical for smaller areas). In addition, this may allow for different thermal properties during a fusing process depending on a location of an object. For example, initial layers (i.e. those formed earlier in additive manufacturing) may, by specifying larger cores or inner segments for such layers, be provided with higher amounts of fusing agent (or of a more effective fusing agent) than upper layers, which may absorb heat from a previous layer.

As mentioned above, in some examples, at least one peripheral segment may be external to the model of the object, comprising an 'atmosphere' segment. This may for example be used to control an extent to which detailing agent is applied about the object. As such agents can be thought of heat reducing, this may be tailored to the amount of heat likely to be generated in a location portion of the object: generally, object portions of smaller cross section may generate less heat than object portions of larger cross section. In some examples, build material from outside the object may adhere to the surfaces of the object, which can decrease the quality of the appearance of the object. For examples, this may occur when unfused or partially fused build material having a white appearance adheres to the surface of the object. Therefore, in some examples, color may be added to a portion of build material corresponding to an external segment to match the color of the object being generated. In other words, the colour may be applied to what is intended to be outside of the object being generated, as some of the build material to which the atmosphere colour is applied may become attached to the object. Moreover, as has been noted above, the color of a face of the object may be dependent on the spatial orientation of the face. Where there is a thicker outer peripheral segment or segments to produce the target color, a thicker 'atmosphere' segment may be specified. For example an upwards facing surface may be specified so as to have a thicker color containing segment(s), and also a thicker external peripheral segment.

As applying color to a region which is intended to be external to the object utilises resources and/or may impact the recyclability of the build material, such a segment may be reduced in thickness, even to zero, in some areas where the quality of the appearance may be considered to be less important. In other examples, color may be used in a first external segment nearer the object, and omitted in a second external segment further from the object, to which a cooling detailing agent may nevertheless be added: as the first external segment increases in thickness, the effectiveness of preventing uncolored build material from adhering to the object may be increased, along with resource cost. By allowing the thickness of the first segment to be controlled, this may allow an intended quality specification in a given build operation to be satisfied without excessive use of colored agents.

Figure 3:
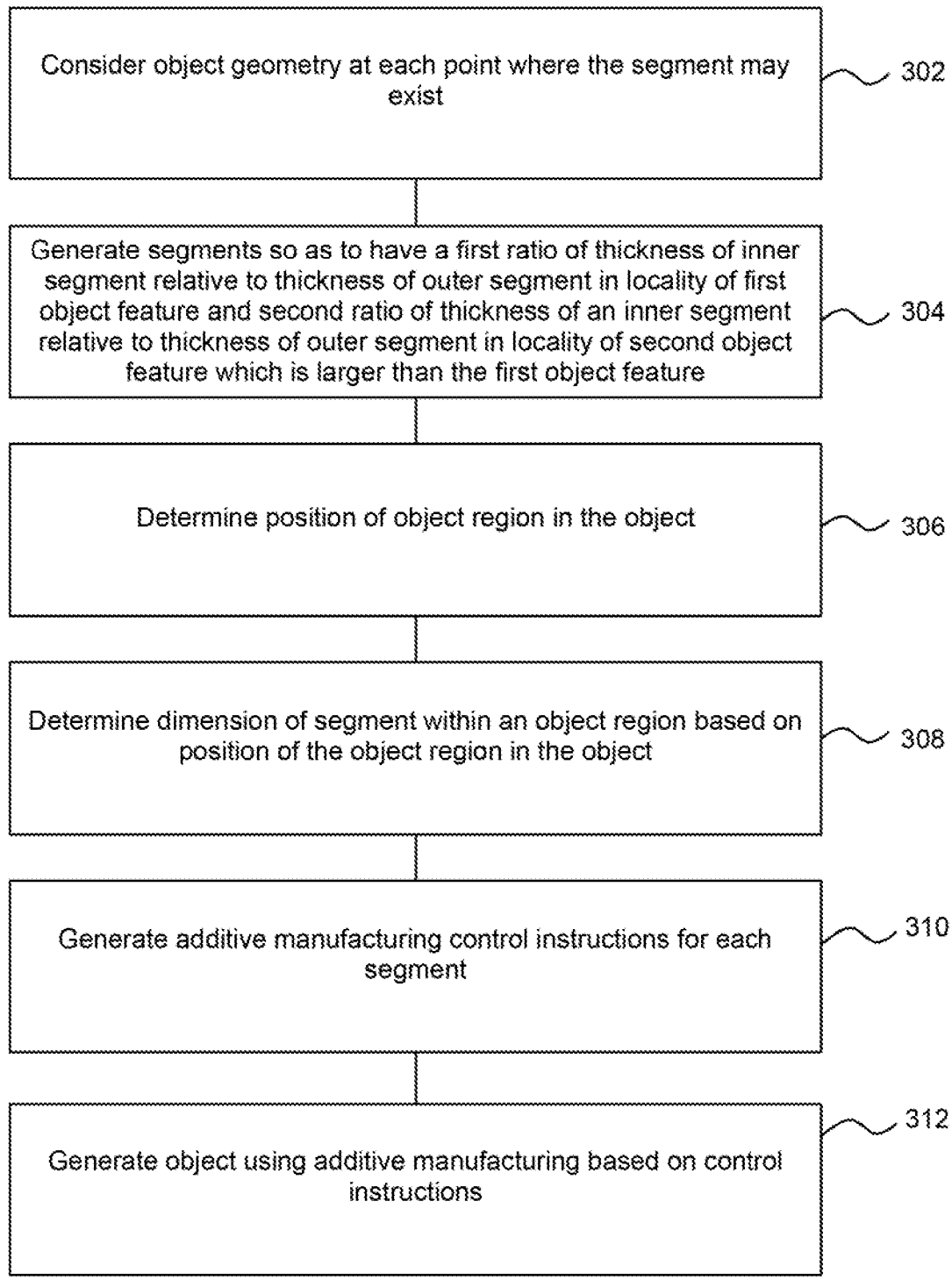
FIG. 3 is an example of a method of generating an object.

FIG. 3 is an example of a method of generating an object, in which blocks 302 to 310 are an example of a method of carrying out block 104 above.

In this example, the dimension to be determined is a thickness, and more particularly, a variable thickness for a peripheral segment is determined.

In block 302, the object geometry is considered, and in this example the local geometry of the object at each point where the segment may exist is considered. When considering a slice of the object, this may comprise a cross-section of the slice at that point. Where the object as a whole is to be segmented, the size of an object feature may be determined. In one example this may comprise integrating for 'voxel density'. A voxel may describe a region of the model and is analogous to a three dimensional pixel. The voxels may be of a consistent shape and size, in some examples being cuboids which are determined such that each voxel can be individually addressed by an object generation apparatus (although such apparatus may also be able to apply print agents with sub-voxel resolution). In some examples, the object properties are specified at voxel resolution.

Integrating for voxel density may comprise determining the number of voxels in, for example, a fixed spherical radius which contains part of an object model to determine local feature size (or circular radius in a slice). In such an example, if there is a high proportion of voxels within this local neighbourhood which are filled with the object, it may be determined that the feature is relatively large. If there are few voxels filled in the local neighbourhood, a small feature may be identified. In other examples, feature size may be determined in some other manner, for example having been tagged by a user or the like.

Block 304 comprises determining the segments so as to have a first ratio of a thickness of an inner segment relative to a thickness of an outer segment in a locality of a first object feature and a second ratio of a thickness of an inner segment relative to a thickness of an outer segment in a locality of a second object feature which is larger than the first object feature. The outer and inner segments may both comprise peripheral segments, or the inner segment may comprise the core. In other words, the relative volume occupied by the segments may vary based on the size of the feature. In some examples, one peripheral segment may be reduced to having zero thickness to allow a size of the core, or the like, to be increased. In some examples, this may occur in the region of a smaller object feature (as was shown in FIG. 2B). In some examples, the thickness of a peripheral segment may be less in the region of a small object feature than in the region of a large object feature (which may for example allow the core to occupy a larger proportion and/or a threshold volume of the smaller object feature)

Block 306 comprises determining a position of the object region in the object and block 308 comprises determining the dimension of a peripheral segment within an object region based on a position of the object region in the object. For example, as mentioned above, the location within the object may be related to the intended physical properties: lower or base portions of the object when generated may be intended to be stronger, or heavier so as to provide an object which resists toppling, and therefore in such regions a core may be emphasised over peripheral segment(s) which may be relatively thin, or have zero thickness. However, upper portions may be segmented differently. In other examples, this may comprise determining when a segment (or at least part thereof) is to be formed, e.g. If this is at the start or towards the end of the additive manufacturing process. In other examples, this may be based on thermal considerations.

Block 308 may for example comprise determining at least one segment to have a variable thickness, wherein the thickness of the segment in a first object region comprising a surface of the object having a first orientation is different to the thickness of the segment in a second object region comprising a surface of the object having a second orientation. For example, this may result in object faces being generated so as to provide different functional or appearance properties.

Block 310 comprises generating additive manufacturing control instructions from the nested object segments, wherein the additive manufacturing control instructions for each segment are generated using different processing parameters. In some examples, this may utilise at least one mapping resource, such as a lookup table. For example, the processing parameters may comprise allowing selection of at least one fusing agent, where the available fusing agent and/or the amount to be applied is different between the segments. The processing parameters for an inner segment may for example allow selection of a 'carbon black' fusing agent (in some examples in combination with a lower-tint fusing agent), whereas surface segment may allow selection of a lower-tint fusing agent and not carbon black fusing agent. An outer peripheral segment may allow selection of colorants to give access to a larger color gamut than an interior segment. One or more 'atmosphere' segments which are exterior to the object may vary as to the availability of a particular detailing agent and/or colorant selection.

Block 312 comprises generating an object using additive manufacturing based on the control instructions. For example, this may comprise forming successive layers of build material on a print bed and applying print agents according to the control instructions for that layer and exposing the layer to radiation, resulting in heating and fusion of the build material.

In examples where the segmentation is performed on a slice by slice basis, blocks 302 to 310 may each be carried out on a slice by slice basis. In other examples, the object model may be segmented as whole and then sliced, in which case block 306 may be carried out for each slice, or the slicing operation may be carried out after block 308 or block 310 has been carried out.

Another aspect of the geometry which may be considered are the orientation of a segment within the object (e.g. whether it is in the vicinity of a front facing surface, a backwards facing, an upward facing surface, a downwards facing surface, or a surface formed at some specified angle).

Figure 4:
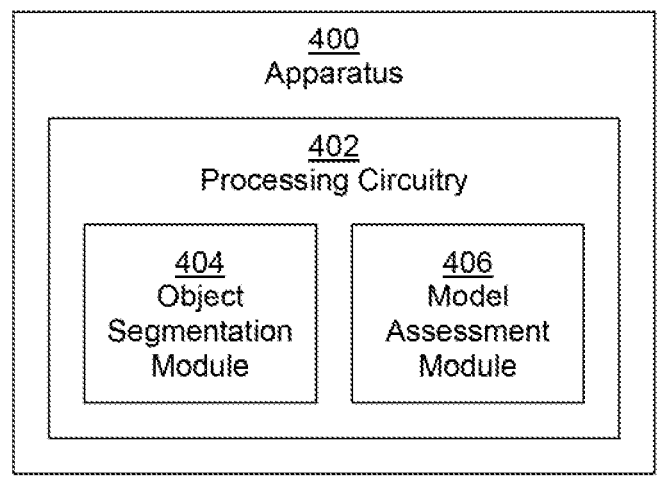
FIGS. 4 and 5 are examples of apparatus for processing data relating to additive manufacturing.

FIG. 4 is an example of an apparatus 400 comprising processing circuitry 402. In this example the processing circuitry 402 comprises an object segmentation module 404 and a model assessment module 406. In use of the apparatus 400, the object segmentation module 404 represents a virtual build volume comprising at least a portion of an object to be generated in additive manufacturing as a plurality of nested segments comprising a peripheral segment and an object core, for example as described above and the model assessment module 406 to determine, from data relating to the object, a relative volumetric composition for the segments based on a geometry of the object. More particularly, the object segmentation module 404 determines a shape of the peripheral segment(s) based on a determination of the model assessment module 406. The shape may follow the contours of the surfaces of an object or may differ therefrom. The shape may be determined such that at least one peripheral segment has a variable thickness. In some examples, the object segmentation module 404 may generate the virtual build volume from a received object model and generating the virtual build volume may comprise modifying the received object model, for example by segmenting the received object model.

For example, as noted above, the model assessment module 406 may determine a plurality of localised relative volumetric compositions for the segments within the object based on a local geometry of the object and at least one intended object property. For example, in the region of a smaller object feature, a core segment may be occupy a relatively larger relative volume than in the region of a larger object feature. In another example, in a lower region of the object, a core segment may be occupy a relatively larger relative volume than in a higher region of the object. In another example, in an intended front face of an object, a peripheral segment (for example, a surface segment) may occupy a higher relative volume than in an intended rear or bottom face, in which a lower appearance quality level may be tolerated.

The processing circuitry 402 may carry out the method of FIG. 1 and/or at least part of FIG. 3.

Figure 5:
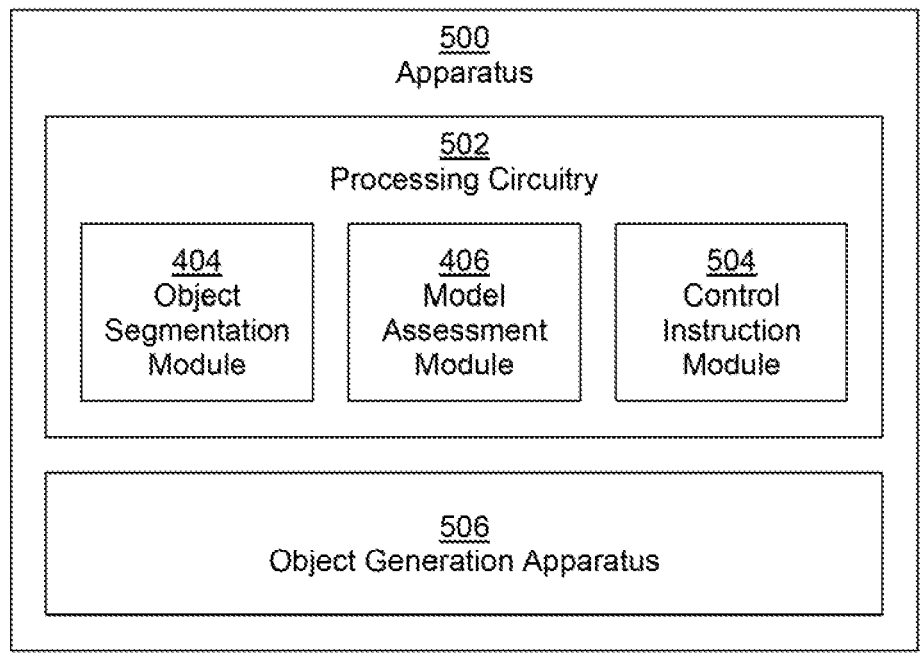

FIG. 5 shows an example of an apparatus 500 comprising processing circuitry 502 which comprises the object segmentation module 404 and the model assessment module 406 as well as a control instruction module 504. The apparatus 500 further comprises an object generation apparatus 506.

In use of the apparatus 500, the control instruction module 504 generates control instructions for generating an object, wherein the generation of control instructions uses different processing parameters for different segments, for example as described in relation to FIG. 3 above.

The object generation apparatus 506 is to generate the object according to the control instructions, and may to that end comprise additional components such as print bed, build material applicators, print agent applicators, heat sources and the like, not described in detail herein.

The apparatus 500 may carry out the method of FIG. 1 and/or FIG. 3.

Figure 6:
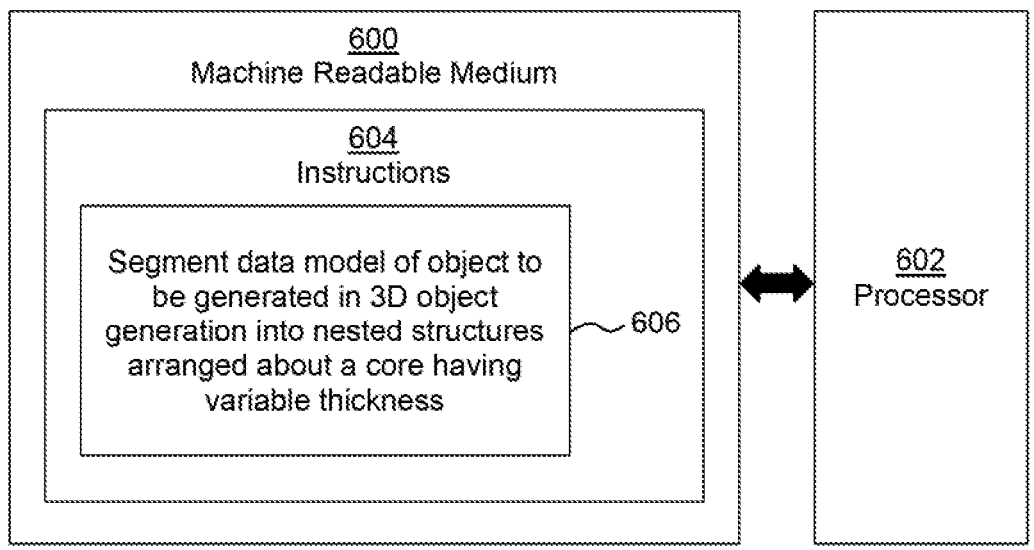
FIG. 6 is an example of a machine readable medium in association with a processor.

FIG. 6 is an example of a tangible, non-transitory, machine readable medium 600 in association with a processor 602. The machine readable medium 600 may be non-transitory and stores instructions 604 which, when executed by the processor 602, cause the processor 602 to carry out processes. The instructions 604 comprise instructions 606 to segment a data model of a virtual build volume comprising at least a portion of an object to be generated in three-dimensional object generation into at least one peripheral segment arranged about a core segment, wherein at least one peripheral segment has a variable thickness. For example, a peripheral segment may be thicker in one region than in another.

In some examples, the instructions 604 may comprise instructions to cause the processor 602 to segment the data model of the object to have a thickness of a segment in an object region based on at least one of (i) a local size of the object. (ii) a local orientation of an object feature, (iii) a vertical position of the object region within the object in an orientation of manufacture and an (iv) intended object property (which may comprise an intended property gradient within the object).

In some examples, the instructions 604 may comprise instructions to cause the processor 602 to determine control instructions for generating an object by applying first processing parameters to a first segment and second processing parameters to a second segment. For example, applying processing parameters may comprise use of a particular mapping resource.

The machine readable medium 600 in association with a processor 602 may carry out at least one of the blocks of FIG. 1 and/or FIG. 3, and/or may provide a module of FIG. 4 or FIG. 5.

Examples in the present disclosure can be provided as methods, systems or machine readable instructions, such as any combination of software, hardware, firmware or the like. Such machine readable instructions may be included on a computer readable storage medium (including but is not limited to disc storage, CD-ROM, optical storage, etc.) having computer readable program codes therein or thereon.

The present disclosure is described with reference to flow charts and block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that various blocks in the flow charts and block diagrams, as well as combinations thereof, can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus functional modules of the apparatus and devices (such as the object segmentation module 404, the model assessment module 406, and the control instruction module 504) may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) In the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising:
   receiving, at a processor, a data model of an object to be generated in an additive manufacturing system;
   segmenting, by the processor, the data model of the object into a plurality of nested segments comprising: a core segment, an inner shell segment enveloping the core segment to partially cover a color of the core segment, and an outer shell segment enveloping the inner shell segment to fully cover the color of the core segment;
   determining thicknesses for different sections of the outer shell segment based on locations and an intended resilience property of the different sections of the outer shell segment on the object to fully cover the color of the core segment, wherein a side section and a top section of the outer shell segment are thicker than a bottom section of the outer shell segment; and
   generating additive manufacturing control instructions for manufacturing the plurality of nested segments using different processing parameters for different segments of the plurality of nested segments.

2. The method according to claim 1, wherein determining the thicknesses for the different sections of the outer shell segment is further based on an intended color of the side section and the top section compared to the bottom section of the outer shell segment.

3. The method according to claim 1, wherein a first ratio of a thickness of the inner shell segment over a thickness of the outer shell segment in a first locality of a first object feature is larger than a second ratio of a thickness of the inner shell segment over a thickness of the outer shell segment in a second locality of a second object feature, wherein the second object feature is larger than the first object feature.

4. The method according to claim 1, wherein a color of the outer shell segment is different from the color of the core segment.

5. The method according to claim 1, wherein the intended resilience property of the different sections of the outer shell segment includes an intended resilience property of the bottom section compared to the side section and the top section of the outer shell segment.

6. The method according to claim 1, further comprising: generating the object based on the additive manufacturing control instructions.

7. An apparatus comprising:
   a processing circuitry; and
   a memory storing instructions that when executed cause the processing circuitry to:
      receive a data model of an object to be generated in an additive manufacturing system,
      segment the data model of the object into a plurality of nested segments comprising: a core segment, an inner shell segment enveloping the core segment to partially cover a color of the core segment, and an outer shell segment enveloping the inner shell segment to fully cover the color of the core segment,
      determine thicknesses for different sections of the outer shell segment based on locations and an intended resilience property of the different sections of the outer shell segment on the object to fully cover the color of the core segment, wherein a side section and a top section of the outer shell segment are thicker than a bottom section of the outer shell segment, and
      generate additive manufacturing control instructions for manufacturing the plurality of nested segments using different processing parameters for different segments of the plurality of nested segments.

8. The apparatus according to claim 7, wherein the intended resilience property of the different sections of the outer shell segment includes an intended resilience property of the bottom section compared to the side section and the top section of the outer shell segment.

9. The apparatus according to claim 7, wherein the instructions further cause the processing circuitry to generate the object based on the additive manufacturing control instructions.

10. The apparatus according to claim 7, wherein the thicknesses for the different sections of the outer shell segment are further determined based on an intended color of the side section and the top section compared to the bottom section of the outer shell segment.

11. A non-transitory machine readable medium storing instructions which, when executed by a processor, cause the processor to:
   receive a data model of an object to be generated in an additive manufacturing system;
   segment the data model of the object into a plurality of nested segments including: a core segment, an inner shell segment enveloping the core segment to partially cover a color of the core segment, and an outer shell segment enveloping the inner shell segment to fully cover the color of the core segment;
   determine thicknesses for different sections of the outer shell segment based on locations and an intended resilience property of the different sections of the outer shell segment on the object to fully cover the color of the core segment, wherein a side section and a top section of the outer shell segment are thicker than a bottom section of the outer shell segment; and
   generate additive manufacturing control instructions for manufacturing the plurality of nested segments using different processing parameters for different segments of the plurality of nested segments.

12. The non-transitory machine readable medium according to claim 11, wherein the intended resilience property of the different sections of the outer shell segment includes an intended resilience property of the bottom section of the outer shell segment compared to the side section and the top section of the outer shell segment.

13. The non-transitory machine readable medium according to claim 11, wherein the instructions further cause the processor to:
   generate the object based on the additive manufacturing control instructions.

* * * * *